US012597728B2

(12) United States Patent
Miyamura et al.

(10) Patent No.: US 12,597,728 B2
(45) Date of Patent: Apr. 7, 2026

(54) CONNECTOR INCLUDING TERMINAL LOCKING PORTION

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Tetsuya Miyamura, Mie (JP); Daisuke Saito, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 301 days.

(21) Appl. No.: 18/280,617

(22) PCT Filed: Feb. 15, 2022

(86) PCT No.: PCT/JP2022/005778
§ 371 (c)(1),
(2) Date: Sep. 6, 2023

(87) PCT Pub. No.: WO2022/190779
PCT Pub. Date: Sep. 15, 2022

(65) Prior Publication Data

US 2024/0154343 A1 May 9, 2024

(30) Foreign Application Priority Data

Mar. 8, 2021 (JP) ................................ 2021-035977

(51) Int. Cl.
*H01R 13/422* (2006.01)
*H01R 13/504* (2006.01)

(52) U.S. Cl.
CPC ....... *H01R 13/4223* (2013.01); *H01R 13/504* (2013.01)

(58) Field of Classification Search
CPC ............ H01R 13/4223; H01R 13/4361; H01R 13/426; H01R 13/424

(Continued)

(56) References Cited

U.S. PATENT DOCUMENTS 5,181,862 A 1/1993 Hawk et al.
5,645,453 A * 7/1997 Yamaguchi ........ H01R 13/4365 439/595

(Continued)

FOREIGN PATENT DOCUMENTS

JP 2000-223198 A 8/2000
JP 2004-006387 A 1/2004
JP 2016-018631 A 2/2016

OTHER PUBLICATIONS

International Search Report issued on Mar. 29, 2022 for WO 2022/190779 A1 (4 pages).

*Primary Examiner* — Marcus E Harcum
(74) *Attorney, Agent, or Firm* — Venjuris, P.C.

(57) ABSTRACT

It is aimed to provide a connector capable of improving a force for holding a terminal fitting by a locking lance. A connector (10) is provided with a housing (20), a terminal locking portion (50) defining a cavity (70) together with the housing (20), and a terminal fitting (90) to be arranged in the cavity (70). The terminal locking portion (50) includes a locking lance (51) for locking the terminal fitting (90). The locking lance (51) is provided on one side surface of the cavity (70) resiliently deformably in a direction intersecting (Continued)

a width direction of the side surface. The housing (20) and the terminal locking portion (50) are made of mutually different materials.

7 Claims, 6 Drawing Sheets

(58) Field of Classification Search
USPC .......................................................... 439/752
See application file for complete search history.

(56) References Cited

U.S. PATENT DOCUMENTS

| | | | | |
|---|---|---|---|---|
| 6,435,920 | B2 * | 8/2002 | Kashiyama ........ | H01R 13/4362 439/752 |
| 6,935,893 | B1 * | 8/2005 | Flowers ............. | H01R 13/4365 439/752 |
| 7,470,156 | B2 * | 12/2008 | Suemitsu ........... | H01R 13/4362 439/752 |
| 7,488,221 | B2 * | 2/2009 | Tanaka ............... | H01R 13/4223 439/752 |
| 7,722,414 | B2 * | 5/2010 | Tanaka ............... | H01R 13/4365 439/757 |
| 10,044,132 | B2 * | 8/2018 | Gagnon ............... | H01R 13/502 |
| 2003/0157833 | A1 * | 8/2003 | Tsuji .................. | H01R 13/4364 439/595 |
| 2019/0115695 | A1 * | 4/2019 | Miyamura ............. | H01R 13/64 |
| 2020/0366024 | A1 | 11/2020 | Kimura et al. | |

* cited by examiner

CONNECTOR INCLUDING TERMINAL LOCKING PORTION

CROSS REFERENCE TO RELATED APPLICATIONS

This application is a national phase of PCT application No. PCT/JP2022/005778, filed on 15 Feb. 2022, which claims priority from Japanese patent application No. 2021-035977, filed on 8 Mar. 2021, all of which are incorporated herein by reference.

TECHNICAL FIELD

The present disclosure relates to a connector.

BACKGROUND

A connector described in Patent Document 1 is provided with a female housing including an accommodation chamber and a female terminal to be accommodated into the accommodation chamber. A resiliently deformable locking lance is provided to project into the accommodation chamber of the female housing. The female terminal is locked by a locking lance while being accommodated in the accommodation chamber.

PRIOR ART DOCUMENT

Patent Document

Patent Document 1: JP 2016-018631 A

SUMMARY OF THE INVENTION

Problems to be Solved

Gaps corresponding to a width of a mold are formed between both end surfaces in a width direction of the locking lance and both end surfaces in the width direction of the accommodation chamber by pulling out the mold for molding the locking lance during the molding of the female housing. Thus, a width of the locking lance has to be smaller than that of the accommodation chamber. As the female housing is reduced in size, there is a problem that it becomes difficult to obtain a holding force for retaining the female terminal.

Accordingly, it is aimed to provide a connector capable of improving a force for holding a terminal fitting by a locking lance.

Means to Solve the Problem

The present disclosure is directed to a connector with a housing, a terminal locking portion defining a cavity together with the housing, and a terminal fitting to be arranged in the cavity, the terminal locking portion including a locking lance for locking the terminal fitting, the locking lance being provided on one side surface of the cavity resiliently deformably in a direction intersecting a width direction of the side surface, and the housing and the terminal locking portion being made of mutually different resin materials.

Effect of the Invention

According to the present disclosure, it is possible to provide a connector capable of improving a force for holding a terminal fitting by a locking lance.

DETAILED DESCRIPTION TO EXECUTE THE INVENTION

[Description of Embodiments of Present Disclosure]

First, embodiments of the present disclosure are listed and described.

(1) The connector of the present disclosure is provided with a housing, a terminal locking portion defining a cavity together with the housing, and a terminal fitting to be arranged in the cavity, the terminal locking portion including a locking lance for locking the terminal fitting, the locking lance being provided on one side surface of the cavity resiliently deformably in a direction intersecting a width direction of the side surface, and the housing and the terminal locking portion being made of mutually different resin materials.

According to the above configuration, since the housing and the terminal locking portion are made of the mutually different resin materials, the terminal locking portion needs not be simultaneously molded by the resin material for molding the housing. Thus, gaps due to the removal of a mold need not be formed on both sides in the width direction of the locking lance and a large width can be ensured for the locking lance. As a result, a force for holding the terminal fitting by the locking lance can be improved.

(2) Preferably, the housing is a primary molded portion made of a primary resin material and the terminal locking portion is a secondary molded portion made of a secondary resin material.

According to the above configuration, the housing and the terminal locking portion can be formed by two-color molding. Thus, a process and a facility for assembling the housing and the terminal locking portion can be omitted. Further, a degree of freedom in the respective shapes of the housing and the terminal locking portion can be enhanced.

(3) Preferably, the width of the locking lance is set to be equal to that of the cavity.

According to the above configuration, a maximally large width of the locking lance can be ensured and the force for holding the terminal fitting by the locking lance can be further enhanced.

(4) Preferably, the terminal locking portion includes a fixing portion to be locked to the housing in a direction intersecting the width direction.

According to the above configuration, the terminal locking portion is stably fixed to the housing by the fixing portion.

(5) Preferably, a pair of the fixing portions project on both sides in the width direction of the locking lance.

According to the above configuration, the terminal locking portion is more stably fixed to the housing by the pair of fixing portions.

[Details of Embodiment of Present Disclosure]

A specific example of an embodiment of the present disclosure is described below with reference to the drawings. Note that the present invention is not limited to this illustration, but is represented by claims and intended to include all changes in the scope of claims and in the meaning and scope of equivalents.

Figure 1:
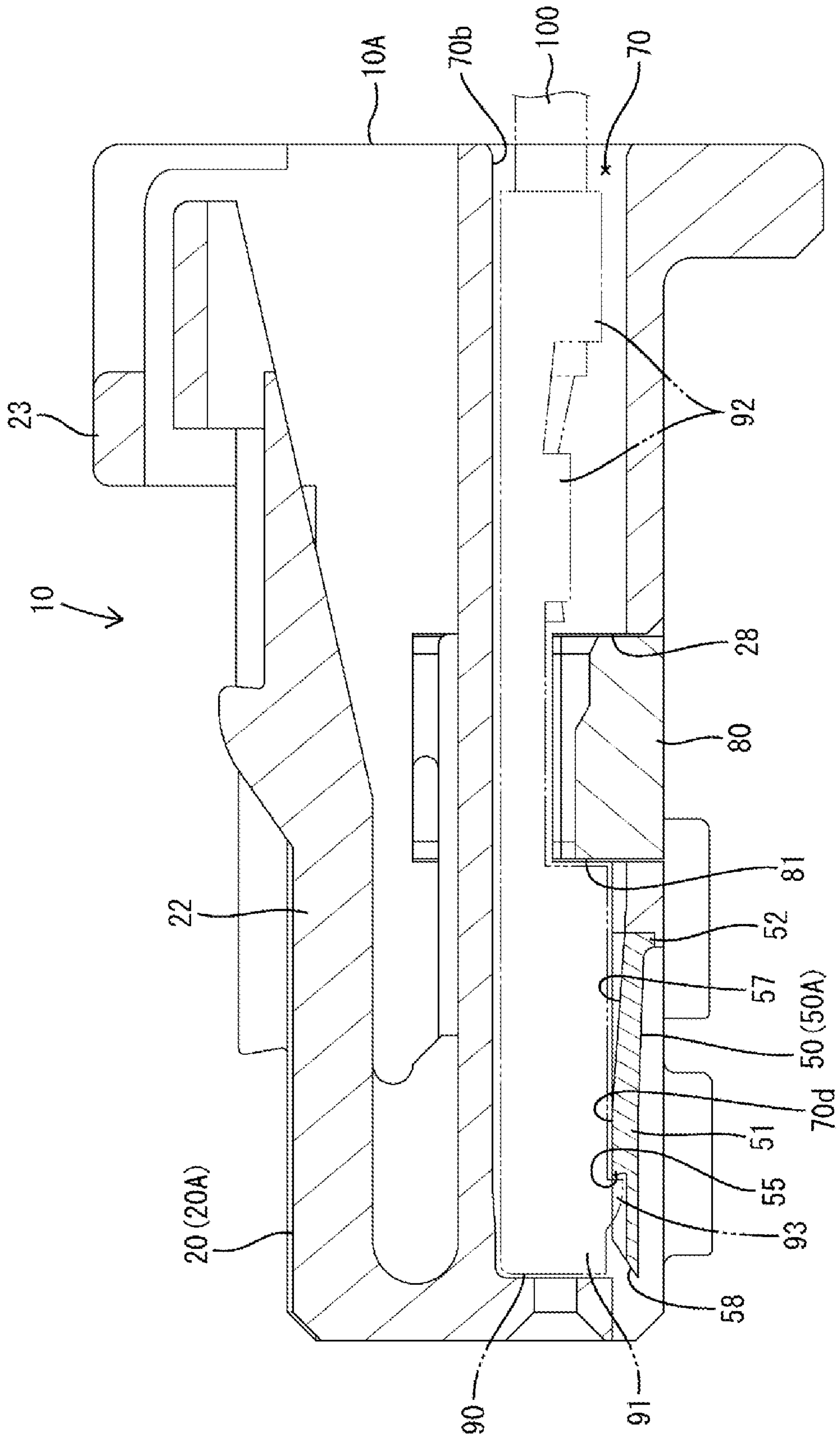
FIG. 1 is a side view in section of a connector according to an embodiment of the present disclosure.

A connector 10 according to this embodiment is provided with a housing 20, terminal locking portions 50, a retainer 80 and terminal fittings 90 as shown in FIG. 1. The terminal fitting 90 is made of electrically conductive metal. The housing 20, the terminal locking portions 50 and the retainer 80 are made of synthetic resin.

The housing 20 and the terminal locking portions 50 are obtained in an integrated state by two-color molding. The housing 20 and the terminal locking portions 50 are made of mutually different resin materials. The housing 20 is, for example, made of PBT (polybutylene terephthalate) serving as a primary resin material. The terminal locking portions 50 are, for example, made of PP (polypropylene) serving as a secondary resin material. The retainer 80 is separate from the housing 20 and the terminal locking portions 50 and movably assembled with the housing 20. Note that, in this specification, an integrated assembly of the housing 20 and the terminal locking portions 50 is referred to as a connector body 10A.

Figure 2:
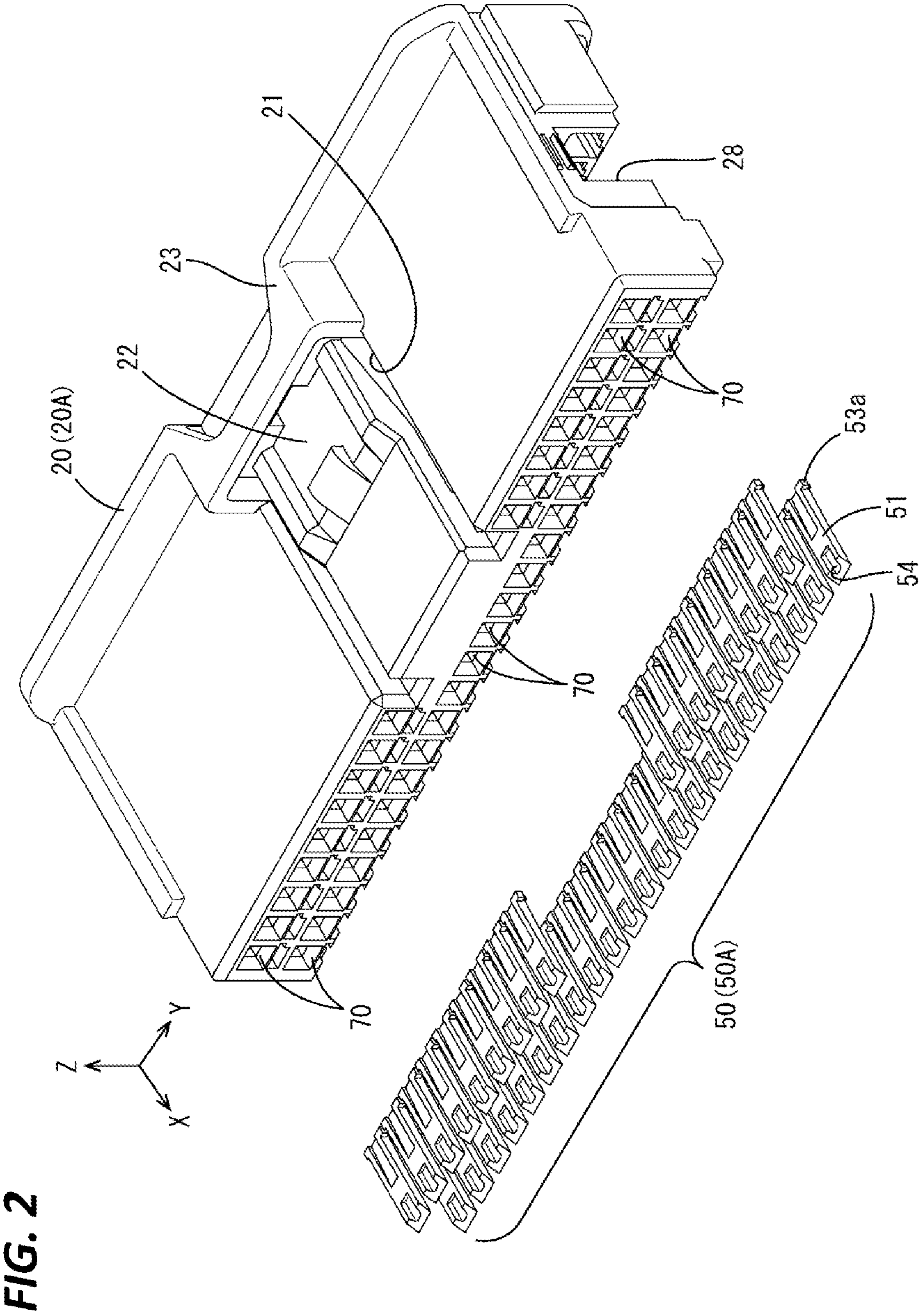
FIG. 2 is an exploded perspective view of a housing and terminal locking portions.

The housing 20 has a rectangular shape when viewed from a height direction (synonymous with a vertical direction, and a Z direction of FIG. 2), and includes a pair of short side parts along a front-rear direction (an X direction of FIG. 2) and a pair of long side parts along a width direction (synonymous with a lateral direction and a Y direction of FIG. 2). Further, the housing 20 has a flat shape short in the height direction as a whole.

The housing 20 includes a recessed portion 21 in a widthwise central part of an upper surface. The housing 20 includes a lock arm 22 arranged to be accommodated in the recessed portion 21. The lock arm 22 is shaped to extend rearward from the front end of the bottom surface of the recessed portion 21. The lock arm 22 is resiliently deformable in the height direction with the front end of the bottom surface of the recessed portion 21 as a fulcrum. The lock arm 22 locks an unillustrated mating housing and holds the housing 20 and the mating housing in a connected state.

The housing 20 includes a wall portion 23 extending in the width direction on the rear end of the upper surface. The wall portion 23 has a part for covering a rear end part of the lock arm 22 from above in a widthwise central part of the housing 20.

The housing 20 forms a plurality of cavities 70, together with the terminal locking portions 50, in the connector body 10A. The terminal fittings 90 are inserted into the cavities 70 from behind the housing 20. As shown in FIG. 2, the respective cavities 70 are arranged side by side in the width direction in the housing 20. Further, the respective cavities 70 are arranged in one lower row below the recessed portion 21 in the widthwise central part of the housing 20 while being arranged in two upper and lower rows in both widthwise end parts of the housing 20.

Figure 5:
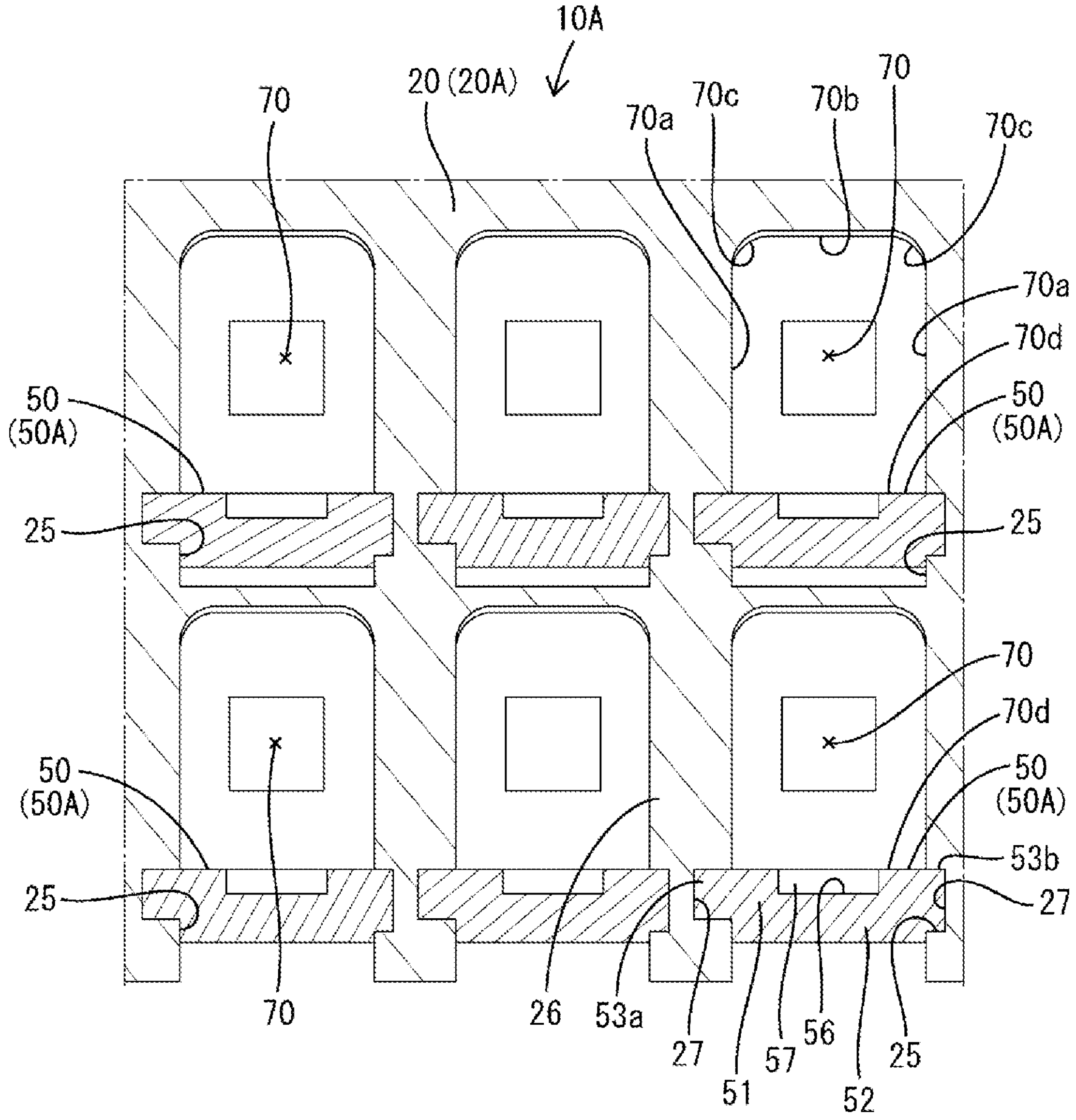
FIG. 5 is a partial enlarged lateral section of the connector body.

Each cavity 70 has a rectangular cross-section. As shown in FIG. 5, out of four side surfaces of the cavity 70, left and right side surfaces 70*a* along the height direction are connected to an upper side surface 70*b* along the width direction via curved corner parts 70*c*. The left and right side surfaces 70*a*, the upper side surface 70*b* and the corner parts 70*c* are constituted as parts of the housing 20.

Out of the four side surfaces of the cavity 70, a lower side surface along the width direction except a front end part is constituted as a part of the housing 20, and the front end part is constituted as a part (cavity-side surface 70*b* to be described later) of the terminal locking portion 50.

Figure 3:
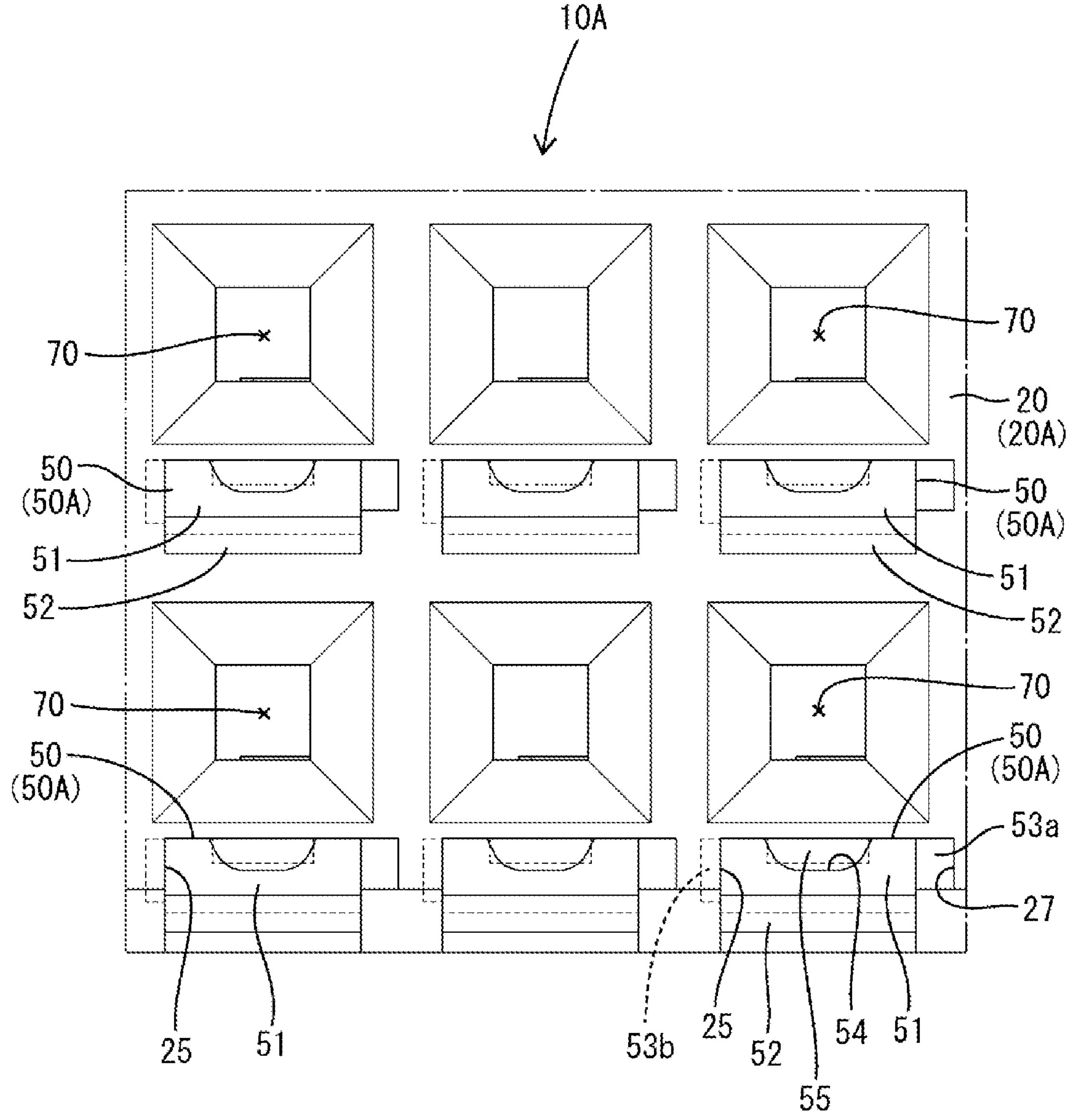
FIG. 3 is a partial enlarged front view of a connector body.
Figure 6:
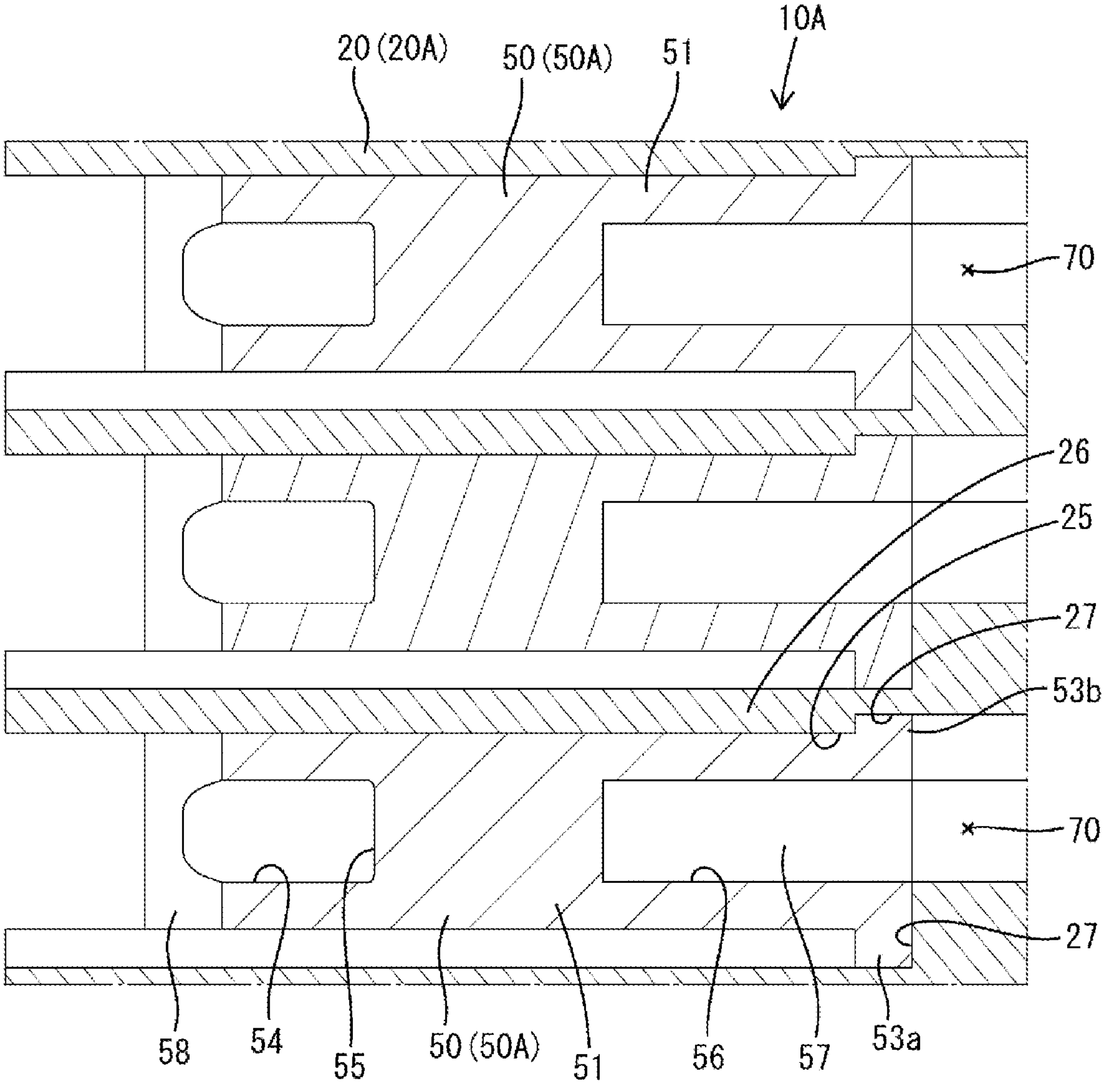
FIG. 6 is a partial enlarged plan view in section of the connector body.

A front end part of the housing 20 includes recesses 25 at positions corresponding to the lower side surfaces (cavity-side surfaces 70*d*) of the respective cavities 70. As shown in FIG. 3, the recesses 25 are open in the front surface of the housing 20. The recesses 25 corresponding to the respective cavities 70 in the lower row are also open in the lower surface of the housing 20. As shown in FIG. 6, the housing 20 includes fixed receiving portions 27 in side walls 26 having the left and right side surfaces 70*a*. The fixed receiving portion 27 is in the form of a recess open in a wall surface of the side wall 26 and communicates with the recess 25. A later-described locking lance 51 of the terminal locking portion 50 is arranged in the recess 25. Later-described fixing portions 53*a*, 53*b* of the terminal locking portion 50 are arranged in the fixed receiving portions 27.

As shown in FIGS. 1 and 2, the housing 20 includes an opening hole 28 open in the lower surface and the both side surfaces and communicating with the respective cavities 70. The opening hole 28 is provided behind the fixed receiving portions 27 in the housing 20. The retainer 80 is inserted into the opening hole 28 from below.

The retainer 80 is shaped to extend long in the width direction although not shown in detail. The retainer 80 is arranged movably to a temporary locking position and a complete locking position with respect to the housing 20. The retainer 80 includes retaining portions 81 at positions corresponding to the respective cavities 70 as shown in FIG. 1. The retaining portions 81 are retracted from the cavities 70 and allow the insertion of the terminal fittings 90 into the cavities 70 at the temporary locking position. The retaining portions 81 project into the cavities 70 and retain and lock the terminal fittings 90 at the complete locking position.

As shown in FIG. 2, the terminal locking portions 50 are individually provided at positions corresponding to the respective cavities 70. The terminal locking portion 50 integrally includes the plate-like locking lance 51 extending in the front-rear direction, a pair of the fixing portions 53*a*, 53*b* projecting on both sides in the width direction from a rear end part of the locking lance 51 and, as shown in FIG. 1, a projecting portion 52 projecting downward from the rear end part of the locking lance 51.

Figure 4:
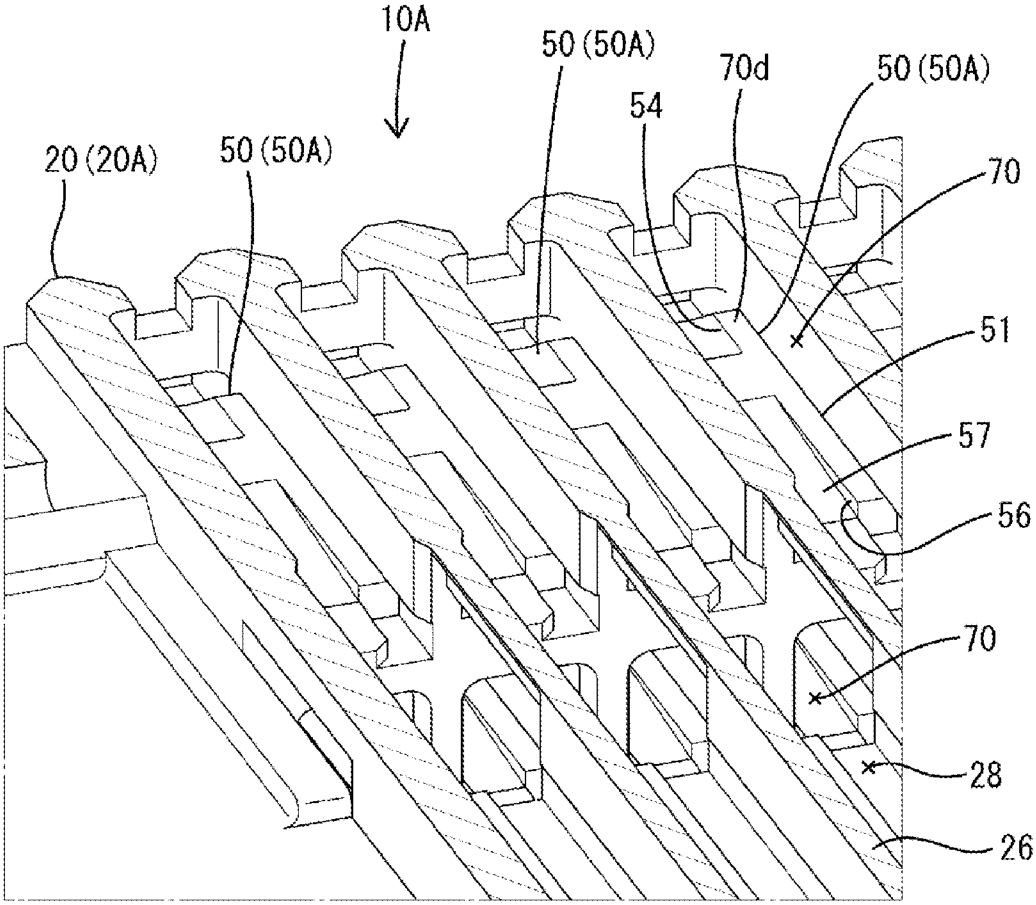
FIG. 4 is a partial enlarged view of a part of the connector body cut in a planar direction when viewed obliquely from an upper-rear side.

The locking lance 51 is resiliently deformable in the height direction within a projection range of the projecting portion 52 with the rear end part as a fulcrum. As shown in FIGS. 4 and 5, the upper surface of the locking lance 51 is facing the inside of the cavity 70 and constituted as the cavity-side surface 70*d*. The cavity-side surface 70*d* is arranged flat along the width direction except a locking recess 54 and an inclined recess 56 to be described later. The cavity-side surface 70*d* constitutes the lower side surface in the front end part of the cavity 70 and is connected at a right angle to the left and right side surfaces 70*a*. As shown in FIG. 1, a later-described body portion 91 of the terminal fitting 90 is arranged to face and be supported by the cavity-side surface 70*d* in the cavity 70.

As shown in FIG. 6, the locking lance 51 has a constant width in the width direction. The width of the locking lance 51 corresponds to that of the cavity-side surface 70*d* and is set (designed) to be equal to that of the cavity 70.

The locking lance 51 includes the locking recess 54 recessed in a front end part of the cavity-side surface 70*d*. The locking recess 54 is a rectangular recess and open upward and forward. As shown in FIG. 1, the rear surface (surface facing forward) of the locking recess 54 serves as a locking surface 55 inclined forward toward an upper side. As shown in FIG. 4, the locking lance 51 includes the inclined recess 56 recessed behind the locking recess 54 in the cavity-side surface 70*d*. The lower surface (upward facing surface) of the inclined recess 56 serves as a guide surface 57 inclined upward toward a front side. As shown in FIG. 1, the locking surface 55 is lockable to a later-described locking projection 93 of the terminal fitting 90. The guide surface 57 can guide the locking projection 93. The front surface of the locking lance 51 serves as a front slope 58 inclined downward from the cavity-side surface 70*d*. If the front slope 58 is pressed by an unillustrated releasing jig, the locking lance 51 is resiliently deformed and the locking of the terminal fitting 90 by the locking lance 51 is released. Note that, as shown in FIG. 6, a width of the locking recess 54 and that of the inclined recess 56 are equal.

The pair of fixing portions 53*a*, 53*b* are in the form of rectangular columns having a rectangular cross-section. As shown in FIGS. 5 and 6, a projecting dimension (lateral dimension) of one fixing portion 53*a*, out of the pair of fixing portions 53*a*, 53*b*, is larger than that of the other fixing portion 53*b*. The pair of fixing portions 53*a*, 53*b* and the projecting portion 52 are positioned to overlap in the front-rear direction in the rear end part of the terminal locking portion 50.

As shown in FIG. 1, the terminal fitting 90 includes the body portion 91 in the form of a rectangular tube and a barrel portion 92 in the form of an open barrel arranged behind the body portion 91. The locking projection 93 is provided to project on the lower surface of the body portion 91. The barrel portion 92 is crimped and connected to an end part of a wire 100. The wire 100 is pulled out rearward of the housing 20 from the cavity 70.

Next, a manufacturing method and functions of the connector 10 are described.

First, the housing 20 serving as a primary molded portion 20A is molded using the primary resin material. The housing 20 is formed with the recesses 25 and the fixed receiving portions 27. Subsequently, the secondary resin material is injected into parts corresponding to the recesses 25 and the fixed receiving portions 27, whereby the terminal locking portions 50 serving as secondary molded portions 50A are molded. The locking lances 51 and the fixing portions 53*a*, 53*b* are respectively formed of the secondary resin material filled into the parts corresponding to the recesses 25 and the fixed receiving portions 27. In this way, the connector body 10A is obtained in which the housing 20 serving as the primary molded portion 20A and the terminal locking portions 50 serving as the secondary molded portions 50A are integrated.

Boundary surfaces between the housing 20 and the terminal locking portions 50 can contact each other, but do not firmly adhere to each other due to low affinity between the primary resin material and the secondary resin material. If time passes, following the opening of a mold, after the two-color molding described above, such a volume change that the widths of the locking lances 51 become smaller than those of the cavities 70 can occur due to a difference in shrinkage rate between the primary resin material and the secondary resin material. As a result, the locking lances 51 can be resiliently deformed in the height direction, maximally utilizing the widths of the cavities 70, in the cavities 70 of the connector body 10A.

As shown in FIGS. 3 and 5, the fixing portions 53*a*, 53*b* can contact the upper and lower surfaces and the left and right surfaces of the fixed receiving portions 27. Thus, the terminal locking portion 50 is stably fixed while being restricted from being shifted in position in the height direction and width direction with respect to the housing 20. As shown in FIG. 6, one fixing portion 53*a* is facing toward the front surface of the housing 20 through the corresponding fixed receiving portion 27, and the other fixing portion 53*b* is facing the inside of the opening hole 28 through the corresponding fixed receiving portion 27.

With the retainer 80 left at the temporary locking position with respect to the housing 20 of the connector body 10A, the terminal fittings 90 are inserted into the cavities 70 from behind the housing 20. In the process of inserting the terminal fitting 90, the locking projection 93 contacts along the guide surface 57 and the locking lance 51 is resiliently deformed downward. In the process of resiliently deforming the locking lance 51, both side surfaces (both end surfaces in the width direction) of the locking lance 51 can be displaced in contact with or in proximity to the left and right side surfaces 70*a* of the cavity 70.

If the terminal fitting 90 is properly inserted into the cavity 70, the locking lance 51 resiliently returns and the locking projection 93 is fit into the locking recess 54. As shown in FIG. 1, the locking projection 93 faces and contacts the locking surface 55 of the locking recess 54, whereby the terminal fitting 90 is primarily restricted from coming out rearward from the cavity 70. Further, the locking projection 93 faces and contacts the left and right surfaces of the locking recess 54, whereby the locking lance 51 is restricted from being shifted in position in the lateral direction. In the case of this embodiment, since the locking lance 51 can be formed over the entire width of the cavity 70, each of the locking recess 54 and the inclined recess 56 can be formed with the left and right surfaces and the locking lance 51 can be provided with a function of restricting a position shift with respect to the terminal fitting 90 even if the connector 10 is of a small size. Thereafter, the retainer 80 is pushed upward and brought to the complete locking position. As shown in FIG. 1, the rear end edge of the body portion 91 is locked by the retaining portion 81, whereby the terminal fitting 90 is secondarily restricted from coming out rearward from the cavity 70.

As descried above, since the primary resin material for molding the housing 20 and the secondary resin material for molding the terminal locking portions 50 are different from each other according to this embodiment, the locking lances 51 of the terminal locking portions 50 can be molded without being restricted by the cavities 70 of the housing 20. Accordingly, a large width of the locking lance 51 can be ensured. As a result, even if the connector 10 is reduced in size, a force for holding the terminal fitting 90 by the locking lance 51 can be enhanced. Particularly, since the width of the locking lance 51 is set to be equal to that of the cavity 70, a maximally large width of the locking lance 51 can be ensured and the force for holding the terminal fitting 90 by the locking lance 51 can be more enhanced.

Further, since the housing 20 and the terminal locking portions 50 can be formed by two-color molding, a process and a facility for assembling the housing 20 and the terminal locking portions 50 can be omitted.

Further, by locking the fixing portions 53*a*, 53*b* to the fixed receiving portions 27 of the housing 20, the terminal locking portion 50 is stably fixed in the vertical direction and lateral direction with respect to the housing 20. Furthermore, since the pair of fixing portions 53*a*, 53*b* project on the both widthwise sides of the locking lance 51, the terminal locking portion 50 is more stably fixed to the housing 20.

[Other Embodiments of Present Disclosure]

The embodiment disclosed this time should be considered illustrative in all aspects, rather than restrictive.

Although the housing and the terminal locking portions are integrally molded by two-color molding in the above embodiment, the housing and the terminal locking portions may be separately molded and the terminal locking portions may be incorporated into the housing later according to another embodiment.

Although the terminal locking portions are individually provided in the respective cavities of the housing in the above embodiment, terminal locking portions may be continuously formed over a plurality of the cavities of the housing according to another embodiment.

Although the locking surface of the locking lance is formed to be inclined in an overhanging manner in the above embodiment, the locking surface of the locking lance may be formed along the height direction according to another embodiment.

LIST OF REFERENCE NUMERALS

10 . . . connector
10A . . . connector body
20 . . . housing
20A . . . primary molded portion
21 . . . recessed portion
22 . . . lock arm
23 . . . wall portion
25 . . . recess
26 . . . side wall
27 . . . fixed receiving portion
28 . . . opening hole
50 . . . terminal locking portion
50A . . . secondary molded portion
51 . . . locking lance
52 . . . projecting portion
53*a* . . . (one) fixing portion
53*b* . . . (other) fixing portion
54 . . . locking recess
55 . . . locking surface
56 . . . inclined recess
57 . . . guide surface
58 . . . front slope
70 . . . cavity
70*a* . . . left/right side surface
70*b* . . . upper side surface
70*c* . . . corner part
70*d* . . . cavity-side surface
80 . . . retainer
81 . . . retaining portion
90 . . . terminal fitting
91 . . . body portion
92 . . . barrel portion
93 . . . locking projection
100 . . . wire

What is claimed is:

1. A connector, comprising:
a housing;
a plurality of terminal locking portions defining a plurality of cavities together with the housing; and
a plurality of terminal fittings arranged in the plurality of cavities, respectively,
wherein each of the plurality of terminal locking portions includes a locking lance configured to lock one of the plurality of terminal fittings,
the locking lance is provided on one side surface of one of the plurality of cavities resiliently deformably in a direction intersecting a width direction of the side surface of the cavity,
the housing and each of the plurality of terminal locking portions are made of mutually different resin materials,
wherein the plurality of terminal locking portions is provided corresponding to the plurality of cavities, and
each of the plurality of terminal locking portions includes a pair of fixing portions that project in opposite directions in a width direction of the locking lance so as to be locked to the housing.

2. The connector of claim 1, wherein the housing is a primary molded portion made of a primary resin material and each of the plurality of terminal locking portions is a secondary molded portion made of a secondary resin material.

3. The connector of claim 1, wherein a width of the locking lance is set to be equal to that of the cavity.

4. The connector of claim 1, wherein each of the plurality of terminal locking portions includes a fixing portion locked to the housing in a direction intersecting the width direction of the locking lance.

5. The connector of claim 4, wherein a pair of the fixing portions project on both sides in the width direction of the locking lance.

6. The connector of claim 1, wherein the housing and the plurality of terminal locking portions are integrally formed by two-color molding.

7. A connector, comprising:
a housing;
a terminal locking portion defining a cavity together with the housing;
a terminal fitting arranged in the cavity; and
the terminal locking portion including a locking lance configured to lock the terminal fitting,
wherein the locking lance is provided on one side surface of the cavity resiliently deformably in a direction intersecting a width direction of the side surface of the cavity,
the housing and the terminal locking portion are made of mutually different resin materials,
the terminal locking portion includes a fixing portion locked to the housing in a direction intersecting a width direction of the locking lance, and
a pair of the fixing portions project on both sides in the width direction of the locking lance.

* * * * *